US012782503B2

(12) United States Patent
Youn et al.

(10) Patent No.: US 12,782,503 B2
(45) Date of Patent: Nov. 3, 2026

(54) AUTOMOTIVE RADAR SYSTEM WITH INTERFERENCE SUPPRESSION

(71) Applicant: NXP B.V., Eindhoven (NL)

(72) Inventors: Jihwan Youn, Eindhoven (NL); Jun Li, San Jose, CA (US); Ryan Haoyun Wu, San Jose, CA (US); Adriana Brigalda, Bucharest (RO); Jeroen Overdevest, Eindhoven (NL)

(73) Assignee: NXP B.V., Eindhoven (NL)

( * ) Notice: Subject to any disclaimer, the term of this patent is extended or adjusted under 35 U.S.C. 154(b) by 201 days.

(21) Appl. No.: 18/905,432

(22) Filed: Oct. 3, 2024

(65) Prior Publication Data

US 2026/0036673 A1 Feb. 5, 2026

(30) Foreign Application Priority Data

Jul. 30, 2024 (RO) ............................... a 202400450

(51) Int. Cl.
*B66B 13/26* (2006.01)
*G01S 7/02* (2006.01)
(Continued)

(52) U.S. Cl.
CPC .............. *G01S 7/354* (2013.01); *G01S 7/023* (2013.01); *G01S 13/931* (2013.01)

(58) Field of Classification Search
CPC ......... G01S 7/354; G01S 7/023; G01S 13/931
See application file for complete search history.

(56) References Cited

U.S. PATENT DOCUMENTS

2022/0018933 A1* 1/2022 Nugraha ............. G01S 13/5246
2023/0160997 A1* 5/2023 Wu ......................... G01S 7/023 342/70

(Continued)

FOREIGN PATENT DOCUMENTS

CN 106353737 A 1/2017

OTHER PUBLICATIONS

Anonymous: "6.4.3.1. Single Exponential Smoothing", Nov. 16, 2023, pp. 1-4, Retrieved from the Internet: URL:https://web.archive.org/web/20231116021839/https://itl.nist.gov/div898/handbook/pmc/section4/pmc431.htm [retrieved on Nov. 21, 2025].

(Continued)

*Primary Examiner* — Nazra Nur Waheed
(74) *Attorney, Agent, or Firm* — Andrew C. Milhollin

(57) ABSTRACT

The present disclosure relates to a radar system having signal processing circuitry configured to receive sets of samples each representing a respective reflected radar signal and to generate sets of interference-suppressed samples including a first set of interference-suppressed samples corresponding to a first reflected radar signal represented by a first set of samples. To generate the first set of interference-suppressed samples, the signal processing circuitry may determine a first threshold based on at least one previously determined threshold for at least a second set of samples of the sets of samples, determine a second threshold based on the first set of samples, determine a third threshold as an average of the first threshold and the second threshold, and apply the third threshold to the first set of samples to remove or suppress interference components of the first set of samples to generate the first set of interference-suppressed samples.

20 Claims, 7 Drawing Sheets

(51) Int. Cl.

| | |
|---|---|
| ***G01S 7/35*** | (2006.01) |
| ***G01S 13/04*** | (2006.01) |
| ***G01S 13/931*** | (2020.01) |
| ***G01S 17/04*** | (2020.01) |
| ***G01S 19/22*** | (2010.01) |
| ***G01S 19/40*** | (2010.01) |
| ***G01S 19/44*** | (2010.01) |

(56) References Cited

U.S. PATENT DOCUMENTS

| | | | | |
|---|---|---|---|---|
| 2023/0231753 | A1* | 7/2023 | Aberl .................. | H04B 1/1036<br>375/130 |
| 2023/0251348 | A1 | 8/2023 | Overdevest et al. | |
| 2023/0375665 | A1* | 11/2023 | Nakamura .............. | G01S 13/34 |
| 2023/0393236 | A1 | 12/2023 | Wu et al. | |
| 2024/0061074 | A1* | 2/2024 | Will ........................ | G01S 13/56 |

OTHER PUBLICATIONS

J. Overdevest, A. G. C. Koppelaar, M. J. G. Bekooij, J . Youn and R. J. G. v. Sloun, "Signal Reconstruction for FMCW Radar Interference Mitigation Using Deep Unfolding," ICASSP 2023—2023 IEEE International Conference on Acoustics, Speech and Signal Processing (ICASSP), Rhodes Island, Greece, 2023, pp. 1-5.

M. Rameez, M. Dahl and M. I. Pettersson, "Autoregressive Model-Based Signal Reconstruction for Automotive Radar Interference Mitigation," in IEEE Sensors Journal, vol. 21, No. 5, pp. 6575-6586, Mar. 2021.

S. Neemat, O. Krasnov and A. Y arovoy, "An Interference Mitigation Technique for FMCW Radar Using Beat-Frequencies Interpolation in the STFT Domain," in IEEE Transactions on Microwave Theory and Techniques, vol. 67, No. 3, pp. 1207-1220, Mar. 2019.

* cited by examiner

AUTOMOTIVE RADAR SYSTEM WITH INTERFERENCE SUPPRESSION

TECHNICAL FIELD

Embodiments of the subject matter described herein relate generally to radar systems, such as automotive radar systems, including interference mitigation techniques for such radar systems.

BACKGROUND

Automotive radar solutions for advanced driver assistance systems (ADAS) are currently being deployed on a large scale, and are typically implemented as long-range radar (LRR) applications or short-range radar (SRR) applications. Both of these applications typically use frequency modulated continuous wave (FMCW) modulation techniques in order to be able to identify objects in the vicinity of the radar system, such as a vehicle or a pedestrian. Such radar systems typically utilize millimeter wave (mmWave) frequencies for transmission and reception or radar signals.

Automotive radar systems and associated signals are susceptible to interference, as may come from other automotive radar systems or other sources. This interference can pose challenges when attempting to accurately and adequately process received radar signal reflections. For example, as the use of automotive radar systems increases, the chance of experiencing radar-to-radar interference on the road escalates, which can degrade the detection automotive radar performance. When a radar system experiences interference due to signals from other radar systems, the detection performance of the radar system deteriorates.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein:

DETAILED DESCRIPTION

Figure 1:
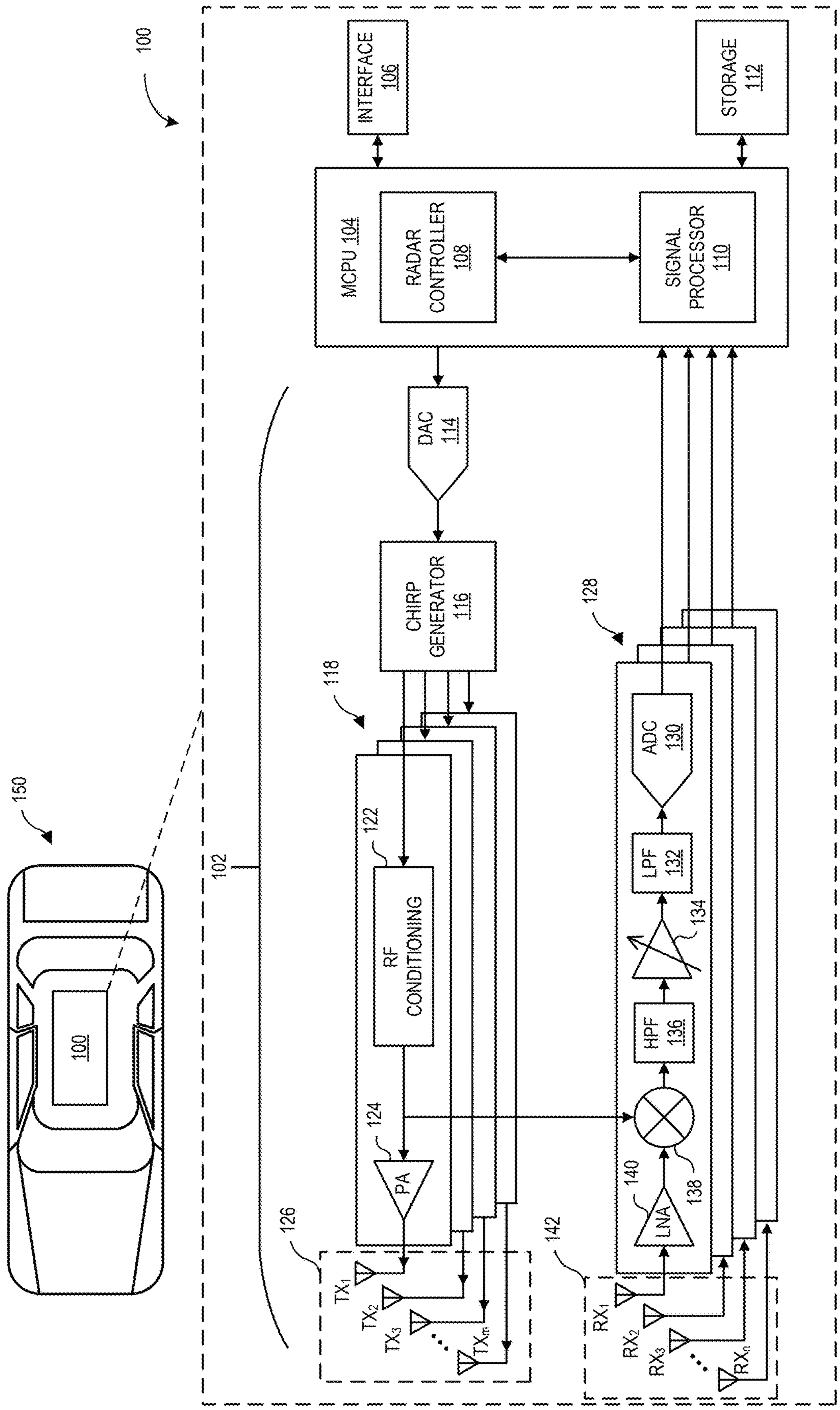
FIG. 1 shows a radar system that may be configured to perform interference suppression, in accordance with various embodiments.

The following detailed description is merely illustrative in nature and is not intended to limit the embodiments described herein and uses of such embodiments. Furthermore, there is no intention to be bound by any expressed or implied theory presented in the preceding technical field, background, or the following detailed description.

For simplicity and clarity of illustration, the figures illustrate the general manner of construction. Descriptions and details of well-known features and techniques may be omitted from the following detailed description to avoid unnecessarily obscuring the present disclosure. For example, the dimensions of some of the elements or regions in the figures may be exaggerated relative to other elements or regions to help improve understanding of embodiments described herein.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. As used herein the terms "approximate," "approximately," "substantial" and "substantially" mean sufficient to accomplish the stated purpose in a practical manner and that minor imperfections, if any, are not significant for the stated purpose.

Along these lines, when used with references to measurable quantities including, but not limited to, dimensions, these terms mean that the quantities are equal to the values stated subject to accepted tolerances of any methods or apparatus chosen to fabricate the described structures or measure the quantities or dimensions described. Directional references such as "top," "bottom," "left," "right," "above," "below," and so forth, unless otherwise stated, are not intended to require any preferred orientation and are made with reference to the orientation of the corresponding figure or figures for purposes of illustration. As used herein, the words "exemplary" and "example" mean "serving as an example, instance, or illustration." Any implementation described herein as exemplary or an example is not necessarily to be construed as preferred or advantageous over other implementations. In addition, certain terms may also be used herein for reference only, and thus are not intended to be limiting.

Herein, elements or nodes or features are sometimes referred to as being "connected" or "coupled" together. As used herein, unless expressly stated otherwise, "connected" means that one element is directly joined to (or directly communicates with) another element in an electrical or non-electrical manner, and not necessarily mechanically. Likewise, unless expressly stated otherwise, "coupled" means that one element is directly or indirectly joined to (or directly or indirectly communicates with) another element in an electrical or non-electrical manner, and not necessarily mechanically. Thus, although the schematic illustrations shown in the figures depict exemplary arrangements of elements, additional intervening elements, devices, features, or components may be present in one or more embodiments of the depicted subject matter.

Various embodiments described herein relate to radar systems, such as automotive radar systems, configured to perform interference suppression using recursive thresholding processes, which, when used to determine a threshold for a given reflected chirp (corresponding to a reflection of a transmitted chirp having been subsequently received by a receive antenna and receive module of the radar system), leverages threshold data from a number of previous reflected chirps. These recursive thresholding processes may be based on time domain or time-frequency domain thresholding processes or any other suitable thresholding processes that operate independently on a single chirp fast-time signal, which may be used to determine a "measured" threshold value for a reflected chirp through analysis of the reflected chirp in the time domain or the time-frequency domain (e.g., spectrogram analysis), respectively.

Conventional time domain and time-frequency domain thresholding approaches may be suitable for single-interferer scenarios, where the interference signal has relatively higher power than the peaks of reflected radar signals. However, as the interference scenario becomes more complex (e.g., due to multiple interference signals with a wide range of power levels), it becomes challenging to determine an appropriate threshold for interference suppression using such conventional techniques, sometimes resulting in weak interference signals being missed (and, therefore, not suppressed) or resulting in unintentional removal of portions of strong peaks that are misidentified as interference (resulting in increased sidelobe levels and introduction of artifacts in the range-Doppler (RD) map).

Embodiments herein address these challenges by using a recursive approach to determining the threshold to be applied to reflected chirp data (e.g., Analog-to-Digital Converter (ADC) data representing a reflected chirp) for interference suppression. For example, by recursively utilizing threshold data from previous reflected chirps when determining the threshold value for a current chirp, embodiments herein may perform more robust threshold estimation even under complex interference scenarios without increasing the latency of chirp-by-chirp processing.

In one or more embodiments, a min-max operation may be performed in conjunction with such recursive thresholding processes to determine a "predicted" threshold value based on the threshold data of the previous reflected chirps. For example, the previous reflected chirps may be logically organized into sections, a respective maximum threshold value may be determined from among the previously determined threshold values of the reflected chirps of each section, and the predicted threshold for a given reflected chirp may be calculated as the minimum threshold value of the resulting set of maximum threshold values. The use of the min-max operation for predicted threshold determination is intended to be illustrative and non-limiting, such that other suitable methods (e.g., moving average filtering, Kalman filtering, particle filtering, as non-limiting examples) may be used to determine the predicted threshold value based the previous reflected chirp threshold data in one or more other embodiments.

In one or more embodiments, an "estimated" threshold value may be determined as an average (mean) of the predicted threshold value and the measured threshold value. In one or more embodiments, the estimated threshold value may only be determined periodically (e.g., once every $N_C$ reflected chirps, where $N_C$ is the number of reflected chirps in each section) in order to reduce the size of buffers used to implement the recursive thresholding process. Once the estimated threshold is determined for a given chirp, the estimated threshold may be applied to remove or suppress interference within the reflected chirp, which may result in an interference-suppressed spectrogram or interference-suppressed ADC samples. For example, portions of the reflected chirp (e.g., ADC samples or spectrogram cells) with magnitudes that are less than the estimated threshold may have their magnitudes reduced or "zeroed" (i.e., set to a magnitude of zero).

FIG. 1 shows an illustrative diagram of a radar system 100 which includes a radar device 102 (sometimes referred to herein as "radar communication circuitry 102" or "radar front-end circuitry 102") that is connected to a radar microcontroller and processing unit (MCPU) 104, where the MCPU 104 may be configured to perform interference suppression of analog-to-digital converter (ADC) samples representing received reflected radar signals. Such interference suppression may be performed prior to range and Doppler compression in accordance with one or more embodiments. In one or more embodiments, the radar system 100 may be a Multiple-Input Multiple-Output (MIMO) radar system, such as a Linear Frequency Modulation (LFM) MIMO radar system (e.g., an LFM automotive MIMO radar system). In one or more embodiments, the radar device 102 may include radar front-end hardware. In one or more embodiments, the radar device 102 may be embodied as a line-replaceable unit (LRU) or modular component that is designed to be replaced quickly at an operating location. Similarly, the radar MCPU 104 may be embodied as a line-replaceable unit (LRU) or modular component. Although a single or mono-static radar devices are shown, it will be appreciated that additional distributed radar devices may be used to form a distributed or multi-static radar. In addition, the depicted radar system 100 may be implemented in integrated circuit form with the radar device 102 and the radar MCPU 104 formed on separate integrated circuits (chips) or on a single chip, depending on the application. In accordance with various embodiments, the radar system 100 may be implemented as part of an automotive system in conjunction with an Advanced Driver Assistance System (ADAS) of a vehicle, such as a vehicle 150. It should be understood that components of the radar system 100 may be distributed at various locations on or within the vehicle 150 (e.g., with antennas located at one or more front, rear, or side panels of the vehicle 150, at front or rear bumpers of the vehicle 150, or at other suitable locations on the vehicle 150, or at a combination of such locations; with processing circuitry, transmitter modules, and receiver modules being disposed at one or more locations inside the vehicle 150).

The radar device 102 includes one or more transmitting antenna elements 126 (sometimes referred to herein as "transmit antennas 126") and receiving antenna elements 142 (sometimes referred to herein as "receive antennas 142") connected, respectively, to one or more radio-frequency (RF) transmitter (TX) modules 118 and receiver (RX) modules 128. Each transmit antenna 126 and TX module may be associated with a respective transmit channel of a group of transmit channels designated herein as $TX_1$, $TX_2$, $TX_3$, . . . $TX_m$, where "m" is the total number of transmit (TX) channels. Each receive antenna 142 and RX module 128 may be associated with a respective receive channel of a group of receive channels designated herein as $RX_1$, $RX_2$, $RX_3$, . . . $RX_n$, where "n" is the number of receive (RX) channels. As a non-limiting example, a radar device (e.g., the radar device 102) can include individual antenna elements (e.g., antenna elements 126) connected, respectively, to four transmitter modules (e.g., the transmitter modules 118) and sixteen receiver modules (e.g., the receiver modules 128). These quantities of transmitter and receiver antenna elements and modules are intended to be illustrative and not limiting, with other quantities of these elements being possible in one or more other embodiments, such as four transmitter modules 118 and six receiver modules 128, or a single transmitter module 118 and/or a single receiver module 128. The radar device 102 includes a chirp generator 116, which is configured to supply chirp input signals to the transmitter modules 118. To this end, the chirp generator 116 is configured to receive input program and control signals, including, as non-limiting examples, a reference local oscillator (LO) signal, a chirp start trigger signal, and program control signals, from the MCPU 104 via a digital-to-analog converter (DAC) 114. The chirp generator 116 is configured to generate chirp signals and send the chirp signals to the transmitter modules 118 for transmission via the transmitting antenna elements 126. In one or more embodiments, each transmitter module 118 includes an RF conditioning module 122 that may be configured to filter the chirp signals. In one or more embodiments, the RF conditioning module 122 may include one or more frequency multipliers configured to increase the frequency of chirp signals output by the chirp generator 116. Each transmitter module 118 includes a power amplifier 124 configured to amplify the filtered, chirp signal before they are provided to and transmitted via one or more corresponding transmitting antenna elements 126. Herein, a transmitted chirp signal is sometimes referred to as a "transmit signal".

The radar signal transmitted by the transmitter modules 118 and transmit antennas 126 may be reflected by an object in an environment of the radar device 102, and part of the reflected radar signal, sometimes referred to herein as a "return signal" or a "reflection", is received by the receiving antenna elements 142 at the radar device 102. In one or more embodiments, the reflected radar signal received via one of the receiving radar elements 142 and a corresponding one of the receiver modules 128 corresponds to a chirp signal transmitted via one of the transmit antennas 126 and a corresponding transmitter module 118, and such a received radar signal may be referred to herein as a "chirp", "chirp signal", or "received chirp signal." Such a received chirp signal may include interference components attributable to one or more interference signals in the environment of the radar system 100. At each receiver module 128, the received (radio frequency) antenna signal is amplified by a low noise amplifier (LNA) 140 and then fed to a mixer 138 where it is mixed with the transmitted chirp signal generated by the RF conditioning module 122. The resulting intermediate frequency signal is fed to a high-pass filter (HPF) 136. The resulting filtered signal is fed to a variable gain amplifier 134, which amplifies the signal before feeding it to a low pass filter (LPF) 132. This re-filtered signal is fed to an analog/digital converter (ADC) 130 and is output by each receiver module 128 (e.g., output to the signal processor 110 of the MCPU 104) as a digital signal. In this way, the receiver modules 128 compress the target echo of various delays into multiple sinusoidal tones whose frequencies correspond to the round-trip delay of the echo.

In the radar system 100, the radar MCPU 104 may be connected and configured to supply input control signals to the radar device 102 and to receive therefrom digital output signals generated by the receiver modules 128. In one or more embodiments, the radar MCPU 104 includes a radar controller 108 and a signal processor 110 (sometimes referred to herein as "signal processing circuitry 110"), either or both of which may be embodied as a microcontroller unit or other processing unit. The MCPU 104, the radar controller 108, and the signal processor 110 each include or are implemented by computer processing circuitry, in accordance with various embodiments. The radar controller 108 can receive data from the radar device 102 (e.g., from the receiver modules 128) and can control radar parameters of the radar device 102, such as frequency band, length of each radar frame, and the like via the DAC 114. For example, the DAC 114 may be used to adjust the radar chirp signals output from the chirp generator 116 included in the radar device 102. The signal processor 110 may be configured and arranged for signal processing tasks such as, but not limited to, target object identification, interference mitigation, computation of the distance or range to a target object, computation of the radial velocity of a target object, and computation of the AoA of signals reflected by a target object, and the like. Herein, the term "AoA" or "Angle-of-Arrival" refers to the angle of a reflected signal (e.g., a radar signal) incident on an antenna array. The signal processor 110 can provide calculated values associated with such computations to a storage 112 and/or to other systems via an interface 106.

The interface 106 can enable the MCPU 104 to communicate with other systems over local and wide area networks, the internet, automotive communication buses, and/or other kinds of wired or wireless communication systems, as non-limiting examples. In one or more embodiments, the MCPU 104 can provide the calculated values over the interface 106 to other systems, such as a radar-camera-lidar fusion system; an automated driving assistance system including parking, braking, or lane-change assistance features; and the like. The storage 112 can be used to store instructions for the MCPU 104, received data from the radar device 102, calculated values from the signal processor 110, and the like. Storage 112 can be any suitable storage medium, such as a volatile or non-volatile computer-readable memory.

To control the transmitter modules 118, the radar controller 108 may, for example, be configured to generate transmitter input signals, such as program, control trigger, reference LO signal(s), calibration signals, frequency spectrum shaping signals (such as ramp generation in the case of Frequency-Modulated Continuous Wave (FMCW) radar). The radar controller may, for example, be configured to receive data signals, sensor signals, and/or register programming or state machine signals for RF (radio frequency) circuit enablement sequences.

At each receiver module 128, digital output signals are generated from target return signals for digital processing by the signal processor 110 to construct and accumulate multiple-input multiple-output (MIMO) array vector outputs forming a MIMO aperture for use in computing plots or maps for AoA estimation and target object tracks. In particular, the signal processor 110 may perform one or more interference suppression processes (e.g., which may include one or more recursive thresholding processes as described herein) on the digital output signals before processing the resultant interference-suppressed samples using one or more fast Fourier transform (FFT) modules or Discrete Fourier Transform (DFT) modules, such as a fast-time (range) FFT module. Processing by these modules of the signal processor 110 generates a range chirp antenna cube (RCAC) and a slow-time (Doppler) FFT module which generates a range-Doppler antenna cube (RDAC) (e.g., including range-Doppler response maps for each RX antenna). The signal processor 110 may then perform Constant False Alarm Rate (CFAR) detection on the range-Doppler antenna cube to detect peaks in the RDAC. The signal processor 110 may further process the RDAC based on the detected peaks to construct a MIMO array vector which the signal processor 110 then processes to perform AoA estimation and target object tracking. The MCPU 104 may then output the resulting target tracks (e.g., via the interface 106) to other automotive computing or user interfacing devices for further processing or display.

In accordance with various embodiments, an interference suppression process performed by the signal processor 110 may utilize a recursive thresholding process. Such a recursive thresholding process may be performed in conjunction with time-frequency domain thresholding or time domain thresholding, as non-limiting examples. Examples of such recursive thresholding processes are described in more detail below.

Conventional interference cancellation techniques used in radar systems typically involve identifying and zeroing interference components in received radar signal data. Such interference components may be identified through comparison of the radar signal data to a magnitude threshold. However, determining a suitable threshold value becomes increasingly challenging as the interference scenario becomes more complex, such as when multiple interference signals with a wide range of power levels are received by a radar system. When an unsuitably high threshold is used in an interference cancellation process, there is an increased likelihood that weak (i.e., lower magnitude) interference components will not be removed from the radar signal data. When an unsuitably low threshold is used in an interference cancellation process, there is an increased likelihood that strong (i.e., higher magnitude) peaks corresponding to a detected object are misidentified as interference components and undesirably removed. To address such challenges, embodiments of recursive thresholding processes described herein may be implemented by, for example, the signal processor 110 of the radar system 100 to improve the likelihood that a suitable threshold will be determined for use in conjunction with interference suppression processes applied to received radar signal data.

For example, a recursive thresholding process may be executed by the signal processor 110 to determine a threshold to be applied for the identification and removal of interference components from received radar signal data in accordance with an interference suppression process. In one or more embodiments, the recursive thresholding process may include determining a first ("predicted") threshold for a current set of radar signal data (e.g., a current received chirp, which may be represented as a set of ADC samples) based on previously determined thresholds determined for previously received sets of radar signal data (e.g., previous chirps), determining a second ("measured") threshold using a thresholding process (e.g., a time domain thresholding process or a time-frequency domain thresholding process, as non-limiting examples), determining a third ("updated") threshold based on the first threshold and the second threshold, and applying the third threshold to remove or suppress interference components from the current set of radar signal data, thereby generating interference-suppressed radar signal data (e.g., interference-suppressed ADC samples). In one or more embodiments, the interference-suppressed radar signal data may include sets of interference-suppressed ADC samples, with each set of interference-suppressed ADC samples corresponding to a respective chirp transmitted by one of the transmitter modules 118, reflected by an object in the environment of the radar system 100, and then received by one of the receiver modules 128. In one or more embodiments, the first or "predicted" threshold may be determined as the maximum threshold value of a set of minimum threshold values of groups ("sections") of previous chirps. That is, the first threshold may be determined using a min-max operation on previously determined thresholds for groups of previous chirps. Examples of recursive thresholding processes that may be performed by the signal processor 110 are described in more detail below in connection with FIGS. 3, 4, and 5.

Figure 2:
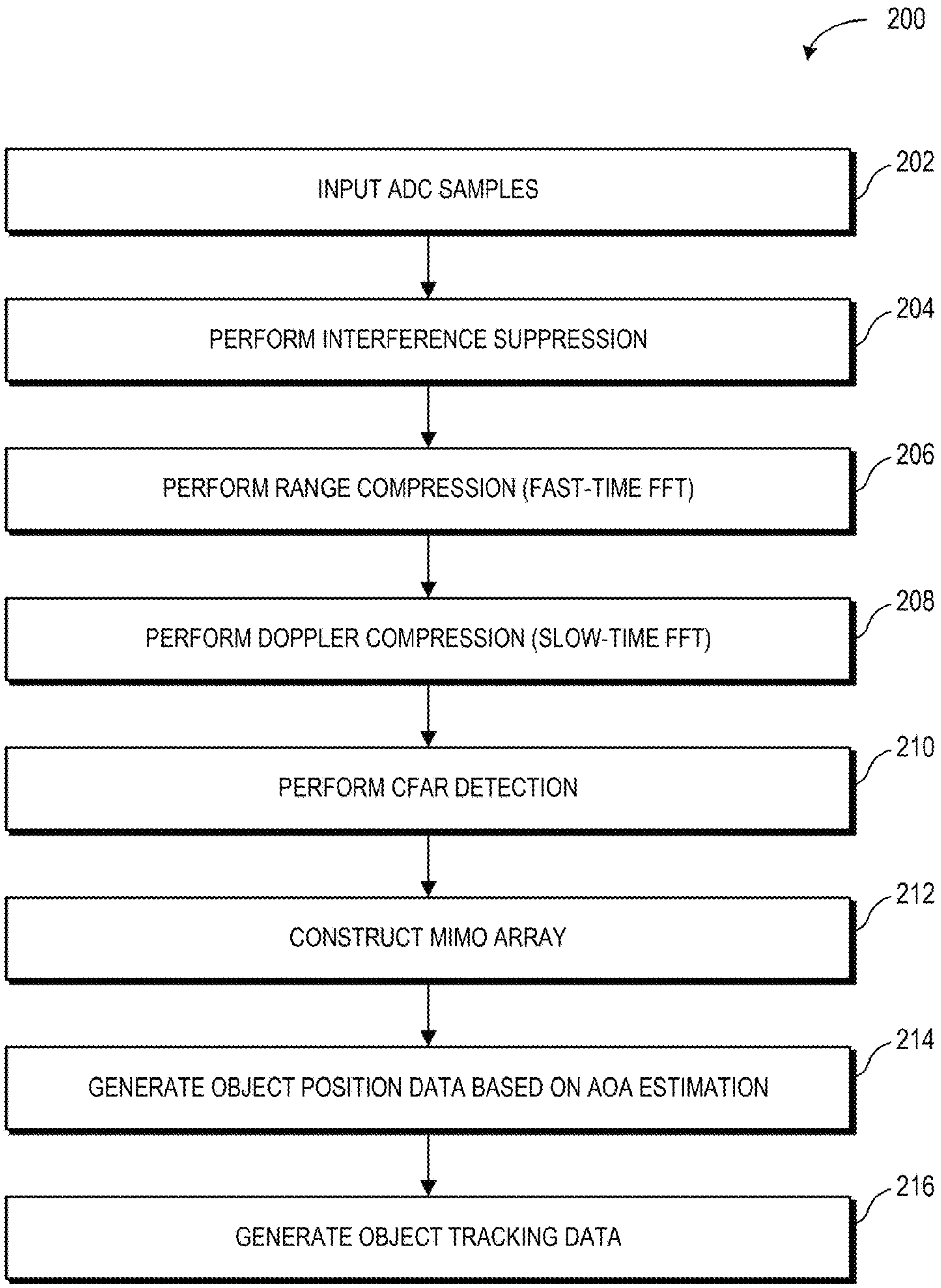
FIG. 2 shows an illustrative process flow for a method of radar signal processing that includes interference suppression, in accordance with various embodiments.

FIG. 2 shows an illustrative process flow for a method 200 by which objects in an environment around a MIMO radar system may be identified and tracked by processing raw data representing sampled return signals corresponding to reflections of transmitted radar signals (e.g., reflected by one or more such objects). The method 200 may be performed using either or both of a radar controller (e.g., the radar controller 108 of FIG. 1) and signal processor (e.g., the signal processor 110 of FIG. 1) of a radar MCPU (e.g., the MCPU 104 of FIG. 1), in accordance with one or more embodiments. The method 200 is described with reference to elements of the radar system 100 of FIG. 1. However, it should be understood that this is illustrative and not limiting, at least in that other suitable radar systems may be used to carry out the method 200 in one or more other embodiments.

At block 202, the signal processor 110 of the MCPU 104 of the radar system 100 receives raw sample data (sometimes referred to as "ADC samples") from one or more ADCs 130 of the receiver modules 128. These ADC samples may be output by the ADCs 130 as digital signals. These ADC samples represent received signals (sometimes referred to as "reflected signals", "return signals", or "reflected chirps") corresponding to reflections of transmit signals, such as chirps, transmitted by the transmitter modules 118 via the transmit antenna elements 126, where the transmit signals are reflected by one or more target objects in the environment of the radar system 100. The return signals are received by the receiver modules 128 via the receive antenna elements 142.

At block 204, the signal processor 110 performs interference suppression to reduce the magnitude of interference components in the raw ADC samples. In accordance with various embodiments, the interference suppression performed by the signal processor 110 may include applying one or more thresholds to the raw ADC samples to remove interference components, where such thresholds are determined using a recursive thresholding process. In one or more embodiments, applying a given threshold to a corresponding set of raw ADC samples includes identifying magnitudes of samples of the first set that exceed the given threshold, and reducing or suppressing (i.e., reducing in magnitude) the identified magnitudes. The recursive thresholding process may include or may be performed in conjunction with a time domain thresholding process or a time-frequency domain (e.g., spectrogram-based) thresholding process, as non-limiting examples. In one or more embodiments, the recursive thresholding process may include determining a first threshold for a current reflected chirp signal based on previously determined thresholds determined for previous reflected chirp signals, determining a second threshold using a thresholding process (e.g., a time domain thresholding process or a time-frequency domain thresholding process, as non-limiting examples), determining a third threshold based on the first threshold and the second threshold. The third threshold may then be applied to generate interference-suppressed ADC samples. In one or more embodiments, such as embodiments in which time domain thresholding is used, the third threshold may be applied directly to the raw ADC samples to remove or suppress interference components in order to generate the interference-suppressed ADC samples. In one or more other embodiments, such as embodiments in which time-frequency domain thresholding is used, the third threshold may be a threshold vector that is applied to a time-frequency domain representation of the raw ADC samples, such as a spectrogram, then converting the time-frequency domain representation back to the time domain to produce the interference-suppressed ADC samples, as described in more detail below in connection with FIGS. 3 and 4.

In one or more embodiments, the first threshold may be determined as the maximum threshold value of a set of minimum threshold values of groups ("sections") of previous reflected chirp signals. That is, the first threshold may be determined using a min-max operation on previously determined thresholds for groups of previous reflected chirp signals. Examples of recursive thresholding processes that may be performed by the signal processor 110 are described in more detail below in connection with FIGS. 3, 4, and 5.

At block 206, the signal processor 110 performs range compression of the interference-suppressed ADC samples by performing a fast-time FFT or DFT on the interference-suppressed ADC samples, for example. The signal processor 110 may generate a range chirp antenna cube (RCAC) as an output of this fast-time FFT or DFT.

At block 208, the signal processor 110 performs Doppler compression of the RCAC by performing a slow-time FFT or DFT on the RCAC, for example. The signal processor 110 may generate a range-Doppler antenna cube as an output of this slow-time FFT or DFT. The range-Doppler antenna cube may be a three-dimensional array having dimensions x×y×z, where x represents the number of Doppler bins, y represents the number of range bins, and z represents the number of RX channels (e.g., corresponding to the number of receive antenna elements 142 or the number of receiver modules 128) represented in the range-Doppler antenna cube. Each element of the range-Doppler antenna cube may encode complex amplitude of a received signal for a particular range bin, Doppler bin, and RX channel.

In the range-Doppler antenna cube, each range bin represents ranges or distances between the radar system and a target object. Each Doppler bin represents Doppler shift values corresponding to velocities at which a target object may be traveling (e.g., relative to the ego velocity of the radar system). Such velocities may be calculated based on the determined Doppler shift associated with the target object.

At block 210, the signal processor 110 performs CFAR detection to determine the location of peaks (i.e., "detected peaks") in the range-Doppler antenna cube. While the signal processor 110 is described as using CFAR detection in the present example, it should be understood that this is intended to be illustrative and not limiting, such that other suitable peak detection approaches may be used in one or more other embodiments.

At block 212, the signal processor 110 constructs a virtual MIMO array based on the range-Doppler antenna cube and the detected peaks.

At block 214, the signal processor 110 generates object position data based, at least in part, on AoA estimation performed using the virtual MIMO array. This object position data represents the positions of objects detected by the radar system 100 (e.g., relative to the position of the radar system 100).

At block 216, signal processor 110 generates object tracking data based on the object position data. In one or more embodiments, the object tracking data may be generated based on multiple sets of object position data acquired (e.g., at block 214) by the radar system 100 over time.

Figure 3:
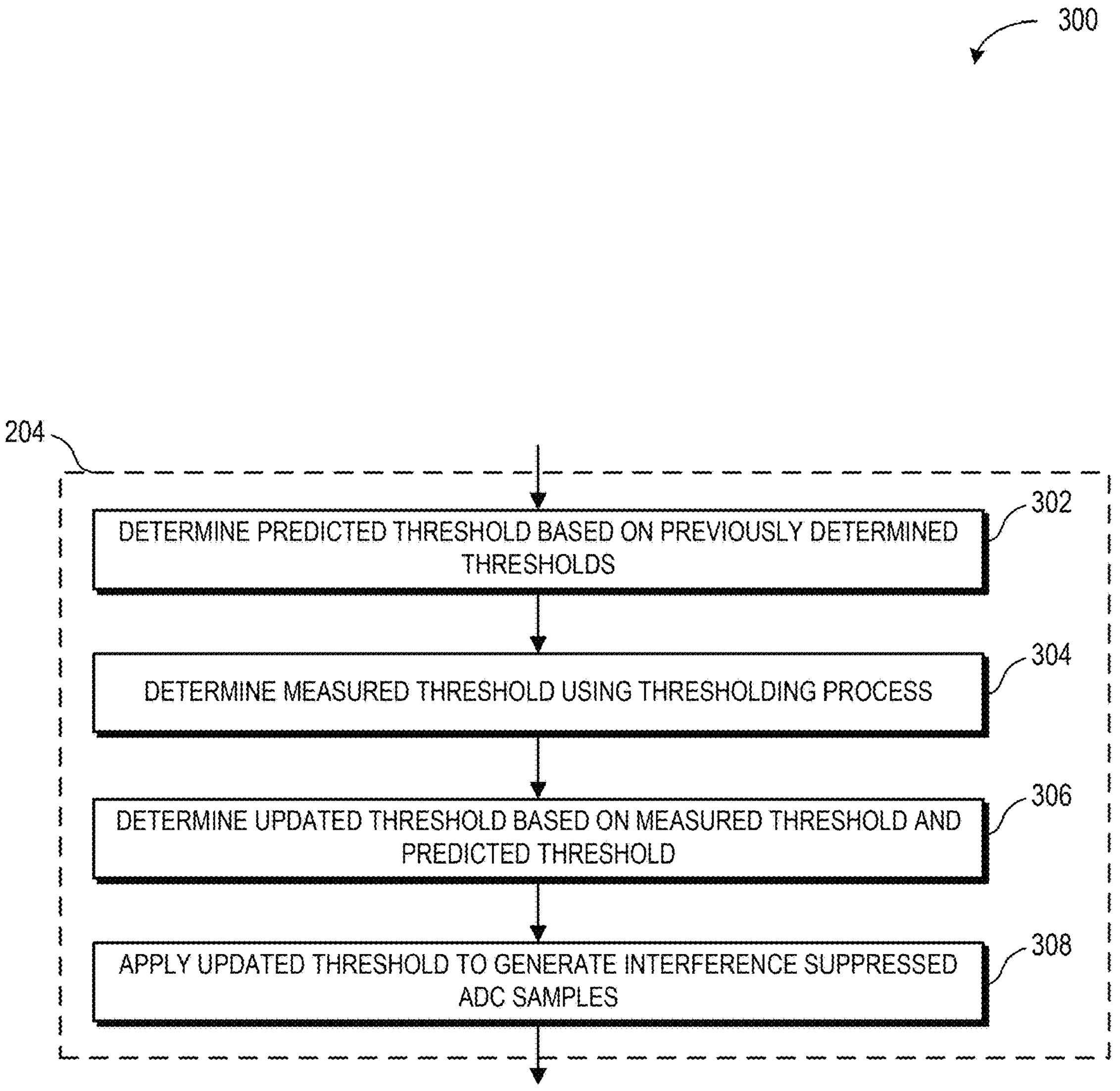
FIG. 3 shows an illustrative process flow for a method of interference suppression that includes recursive thresholding, in accordance with various embodiments.

FIG. 3 shows an illustrative process flow for a method 300 by which a signal processor of a radar system (e.g., the signal processor 110 of the radar system 100 of FIG. 1) may perform recursive thresholding (e.g., determining or estimating a threshold recursively) and interference suppression. For example, a recursive thresholding process may be performed as part of an interference suppression process for removing or suppressing interference components raw ADC samples representing reflected radar signals (e.g., chirps). In one or more embodiments, the method 300 may be performed at block 204 of the method 200 of FIG. 2. The method 300 is described here with reference to elements of the radar system 100 of FIG. 1. However, it should be understood that this is illustrative and not limiting, at least in that other suitable radar systems may be used to carry out the method 300 in one or more other embodiments.

Prior to performing the method 300 (e.g., at block 202 of the method 200 of FIG. 2), the signal processor 110 receives raw ADC samples from an ADC 130 that is coupled to one of the receiver modules 128 and a corresponding one of the RX antennas 142. In the present example, a set of raw ADC samples corresponding to a reflected chirp signal (including interference) may be referred to as the "current chirp" or the "current reflected chirp". Previously processed sets of raw ADC samples corresponding to previous reflected chirp signals (including interference) may be referred to as "previous chirps" or "previous reflected chirps".

At block 302, the signal processor 110 determines a first or "predicted" threshold based on previously determined thresholds for previous reflected chirps. In one or more embodiments, a min-max operation may be performed on groups ("sections") of previously determined thresholds for previous reflected chirps in order to determine the predicted threshold for the current reflected chirp. For example, the signal processor 110 may determine a set of maximum thresholds including the maximum threshold values for each group of previous reflected chirps and may determine the predicted threshold for the current reflected chirp as the minimum of the set of maximum thresholds. If available, updated thresholds (explained below) for the previous reflected chirps may be used as the previously determined thresholds for those chirps when determining the predicted threshold for the current reflected chirp. Otherwise, if an updated threshold is not available for one or more of the previous reflected chirps, then the measured thresholds (explained below) for those chirps may be used as the previously determined thresholds for those chirps when determining the predicted threshold for the current reflected chirp.

In one or more embodiments, such as embodiments in which time domain thresholding is performed to determine the measured threshold (described below), the predicted threshold may be a single threshold value representing a magnitude threshold for the ADC samples. In one or more other embodiments, such as embodiments in which time-frequency domain thresholding is performed to determine the measured threshold, the predicted threshold may be a vector of threshold values (sometimes referred to as an "predicted threshold vector" in such embodiments), including threshold values for each row (e.g., frequency bin) of a spectrogram representation of the ADC samples, with each of the threshold values representing a magnitude threshold for spectrogram cells of the row corresponding to that threshold value.

At block 304, the signal processor 110 determines a second or "measured" threshold for the current reflected chirp using a thresholding process, which may be a non-recursive thresholding process. In one or more embodiments, determining the measured threshold is performed by the signal processor 110 using a time domain thresholding process. As a non-limiting example, the time domain thresholding process may include determining a magnitude of each ADC sample associated with the current reflected chirp, grouping the samples into subsets, determining a maximum magnitude of each subset, extracting the 'n'th lowest maximum magnitude (where 'n' is a predetermined positive integer), and multiplying the 'n'th lowest maximum magnitude by a predetermined upscaling factor (e.g., a positive scalar) to determine the measured threshold.

In one or more other embodiments, determining the measured threshold at block 304 includes determining the measured threshold using a time-frequency domain thresholding process. As a non-limiting example, the time-frequency domain thresholding process may include computing a spectrogram based on the ADC samples corresponding to the current reflected chirp using a Short-Time Fourier Transform (STFT), computing the absolute value of each of the spectrogram samples (sometimes referred to as "spectrogram cells"), and determining a threshold value for each frequency bin of the spectrogram. For example, each threshold value may be calculated for the corresponding frequency bin of the spectrogram based on a predetermined expected magnitude for that frequency bin, based on histogram analysis of the frequency bin, or based on one or more other suitable factors or statistical analyses, as non-limiting examples. For example, the spectrogram may correspond to a two-dimensional array of spectrogram cells, each having a respective cell value. As a non-limiting example, spectrogram cells of the spectrogram may be arranged in rows and columns, with each row corresponding to a respective frequency bin and each column corresponding to respective time. The measured threshold may be a vector of the threshold values (sometimes referred to as a "measured threshold vector" in such embodiments) calculated for each frequency bin of the spectrogram. In such embodiments, the predicted and updated thresholds may each be respective vectors of threshold values, with each vector being of the same length as the vector of threshold values of the measured threshold.

At block 306, the signal processor 110 determines a third or "updated" threshold for the current reflected chirp based on the measured threshold determined at block 304 and the predicted threshold determined at block 302. In one or more embodiments, such as embodiments in which time domain thresholding is performed to determine the measured threshold, the updated threshold may be a single threshold value that is calculated by the signal processor 110 as an average (e.g., mean) of the measured threshold and the predicted threshold.

In one or more other embodiments, such as embodiments in which time-frequency domain thresholding is performed to determine the measured threshold, the updated threshold may be a vector of threshold values (sometimes referred to as an "updated threshold vector" in such embodiments), where each threshold value of the vector of the updated threshold is calculated as an average (e.g., mean) of a corresponding threshold value of the measured threshold vector and a corresponding threshold value of the predicted threshold vector (e.g., with the threshold values used in the calculation corresponding to the same vector index and, therefore, the same frequency bin). In other words, for each frequency bin of the spectrogram, the average of a threshold value of the predicted threshold vector corresponding to that frequency bin and a threshold value of the measured threshold vector corresponding to that frequency bin may be calculated to determine a threshold value of the updated threshold vector corresponding to that frequency bin.

At block 308, the signal processor 110 applies the updated threshold determined at block 306 to generate interference suppressed ADC samples. In one or more embodiments, such as embodiments in which time domain thresholding is performed to determine the measured threshold, the signal processor 110 may apply the updated threshold to generate the interference suppressed ADC samples by identifying ADC samples of the set of ADC samples associated with the current reflected chirp having respective magnitudes exceeding the updated threshold, and then suppressing (i.e., reducing in magnitude) or zeroing (i.e., setting to zero) the magnitudes of the identified ADC samples.

In one or more other embodiments, such as embodiments in which time-frequency domain thresholding is performed to determine the measured threshold, the threshold values of the updated threshold vector may be applied to a spectrogram representing the set of ADC samples associated with the current reflected chirp (e.g., this spectrogram may be computed when determining the measured threshold vector at block 304, as described above). The threshold values of the updated threshold vector may be applied by comparing each threshold value of the updated threshold value to a corresponding row (i.e., frequency bin) of spectrogram cells of the spectrogram, then suppressing, zeroing, or otherwise reducing the magnitude of any spectrogram cells of that row having a magnitude that exceeds that threshold value. After the threshold values of the updated threshold vector are applied to the spectrogram to produce an interference-suppressed spectrogram, an inverse STFT may performed to convert the interference-suppressed spectrogram back to the time domain, thereby producing interference-suppressed ADC samples for the current reflected chirp.

In one or more embodiments, in response to determining that less than a predetermined number of previously determined thresholds (e.g., less than $N_C \times N_S$ previously determined thresholds corresponding to $N_C \times N_S$ previous reflected chirps) are available, the signal processor 110 may be configured to use the measured threshold for the current reflected chirp as the threshold for applying interference suppression for the current reflected chirp to generate the interference-suppressed ADC samples. In such cases, the measured threshold may also be used as the previously determined threshold for the current reflected chirp when determining the predicted threshold for one or more subsequent reflected chirps.

Figure 4:
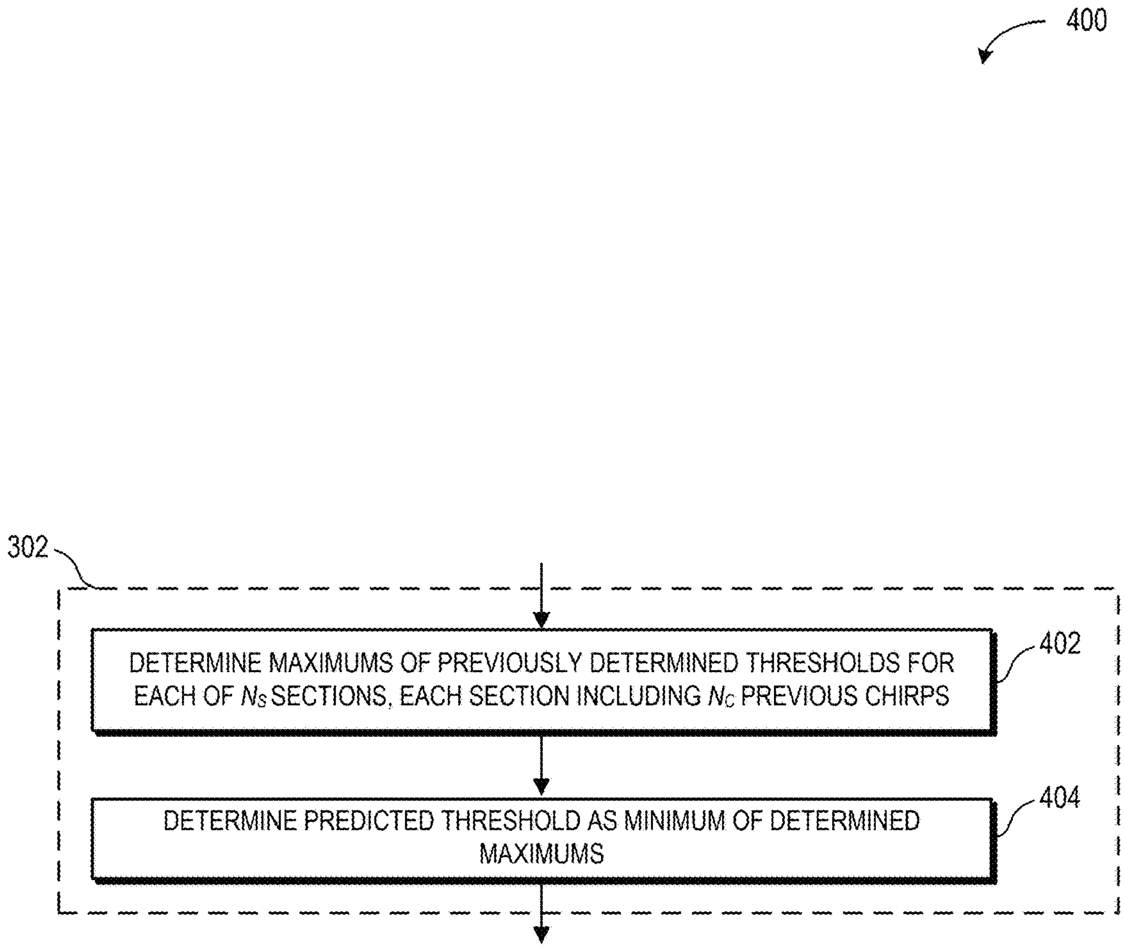
FIG. 4 shows an illustrative process flow for a method of threshold determination that utilizes a min-max operation and that is usable with method of interference suppression, such as the method of FIG. 3, in accordance with various embodiments.

FIG. 4 shows an illustrative process flow for a method 400 by which a signal processor of a radar system (e.g., the signal processor 110 of the radar system 100 of FIG. 1) may determine a predicted threshold based on previously determined thresholds (e.g., for previous sets of ADC samples, which may represent previous reflected chirps) as part of a recursive thresholding process and a related interference suppression process. In one or more embodiments, the method 400 may be performed at block 302 of the method 300 of FIG. 3. The method 400 is described here with reference to elements of the radar system 100 of FIG. 1. However, it should be understood that this is illustrative and not limiting, at least in that other suitable radar systems may be used to carry out the method 400 in one or more other embodiments.

At block 402, the signal processor 110 determines a set of maximum values, each maximum value being calculated as a maximum of previously determined thresholds for groups ("sections") of previous sets of ADC samples. Each set of ADC samples may represent or otherwise corresponding to a respective previous reflected chirp. For example, the signal processor 110 may be configured to determine a predicted threshold for a current reflected chirp based on $N_S \times N_C$ previously determined thresholds for a set of $N_S \times N_C$ previous reflected chirps, where $N_S$ is a number of sections into which the previous reflected chirps are logically divided and $N_C$ is the number of previous reflected chirps in each section. The previously determined thresholds for the set of previous reflected chirps may include updated thresholds, measured thresholds, or a combination of updated and measured thresholds (as described above) having been previously determined by the signal processor 110 for the previous reflected chirps. In one or more embodiments, these previous reflected chirps may be a contiguous set of previous reflected chirps (i.e., with no intervening previous reflected chirps being excluded from the set) received from the associated receiver module 128 immediately prior to the current reflected chirp.

At block 404, the signal processor determines the predicted threshold as the minimum of the set of maximums determined at block 404.

The determination of the set of maximums at block 402 and the determination of the minimum at block 404 may, together, be considered a min-max operation. In this way, the predicted threshold for the current reflected chirp may be determined by the signal processor using a min-max operation.

In one or more embodiments, such as embodiments in which time-frequency domain thresholding is performed to determine the measured threshold based on a spectrogram representation of the ADC samples of the current reflected chirp, the previously determined thresholds may each be previously determined threshold vectors, with each threshold vector including respective threshold values for each row (i.e., frequency bin) of a spectrogram representation of ADC samples of a previous reflected chirp corresponding to that threshold vector, and the min-max operation performed at blocks 402 and 404 may be performed separately for each previously determined threshold vector index. That is, the min-max operation may be performed separately for the threshold values (of the previously determined threshold vectors) associated with each spectrogram frequency bin. For example, the threshold value at the first index of the predicted threshold vector may be calculated as the minimum of the per-section maximums of the threshold values at the first indices of the previously determined threshold vectors, the threshold value at the second index of the predicted threshold vector may be calculated as the minimum of the per-section maximums of the threshold values at the second indices of the previously determined threshold vectors, and so on.

Figure 5:
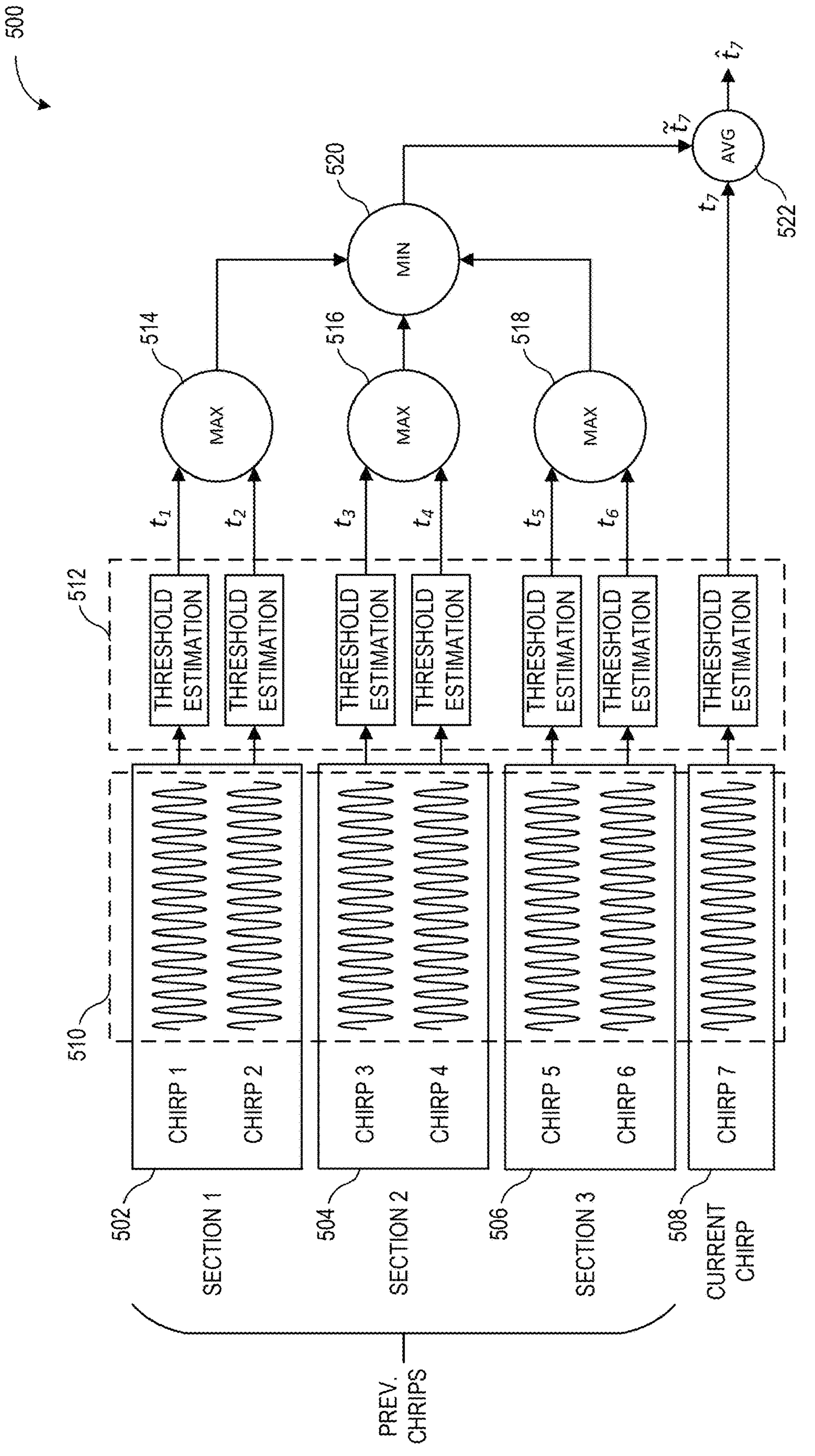
FIG. 5 shows an illustrative block diagram showing an interference suppression process that includes recursive thresholding that utilizes a min-max operation, in accordance with various embodiments.

FIG. 5 shows an illustrative block diagram 500 representing a recursive thresholding process by which a signal processor of a radar system (e.g., the signal processor 110 of the radar system 100 of FIG. 1) may determine a predicted threshold based on previously determined thresholds (e.g., for previous sets of ADC samples, which may represent previous reflected chirps) as part of a recursive thresholding process and a related interference suppression process. For example, the recursive thresholding process of the diagram 500 may correspond to one or more embodiments the method 300 of FIG. 3, the method 400 of FIG. 4, or both. The diagram 500 is described here with reference to elements of the radar system 100 of FIG. 1. However, it should be understood that this is illustrative and not limiting, at least in that other suitable radar systems may be used to carry out the recursive thresholding process shown in the diagram 500 in one or more other embodiments.

Reflected chirps 510 represent radar signal data received via an antenna and receiver module, such as one of the RX antennas 142 and a corresponding one of the receiver modules 128 of the radar system 100. The radar signal data may be provided to the signal processor 110 of the MCPU 104 as a sequence of raw ADC samples generated by the ADC 130 of the corresponding receiver module 128. The radar signal data representing each reflected chirp 510 may correspond to a reflection of a respective chirp signal transmitted by at least one of the transmitter modules 118 and at least one of the TX antennas 126. Such a reflected chirp may be reflected by an object in the environment of the radar system 100, for example. The radar signal data representing the reflected chirps 510 may initially contain noise from interfering signals, such as interfering radar signals from other radar systems. Noise components in each reflected chirp 510 that are attributable to such interfering signals may be removed or suppressed by the signal processor 110 using an interference suppression process based on thresholds that the signal processor 110 determines for each reflected chirp 510 using, for example, the recursive thresholding process shown.

In the present example, a sequence of seven reflected chirps is shown (e.g., each received via the same receiver module), with the seventh chirp in the sequence being the "current reflected chirp" and the first through sixth reflected chirps in the sequence being the "previous reflected chirps". In one or more embodiments, the number of previous reflected chirps considered when determining a threshold to be applied for a current reflected chirp may be equal to $N_S \times N_C$ where $N_S$ is a number of sections into which the previous reflected chirps are logically divided and $N_C$ is the number of previous reflected chirps in each section. In the present example, $N_S=3$ as the previous reflected chirps are logically organized into a first section 502, a second section 504, and a third section 506, and $N_C=2$ as there are two previous reflected chirps in each section, such that six previous reflected chirps are considered, and the signal processor 110 is configured to generate the updated threshold for the current reflected chirp based on six previously determined thresholds (one for each previous reflected chirp).

In the present example, threshold estimation blocks 512 are implemented by the signal processor 110 to determine thresholds $t_1$, $t_2$, $t_3$, $t_4$, $t_5$, and $t_6$ for the first, second, third, fourth, fifth, and sixth previous reflected chirps, respectively, and to determine a measured threshold $t_7$ for the current reflected chirp. In one or more embodiments, each of the thresholds $t_1$, $t_2$, $t_3$, $t_4$, $t_5$, and $t_6$ corresponds to a respective updated threshold (i.e., a threshold that is calculated for a given reflected chirp in accordance with the present recursive thresholding process based on previously determined thresholds for the $N_S \times N_C$ reflected chirps preceding the given reflected chirp). In one or more other embodiments, each of the thresholds $t_1$, $t_2$, $t_3$, $t_4$, $t_5$, and $t_6$ corresponds to a respective measured threshold (i.e., a threshold that is calculated using a conventional or non-recursive thresholding process that is different from the present recursive thresholding process). In one or more other embodiments, the thresholds $t_1$, $t_2$, $t_3$, $t_4$, $t_5$, and $t_6$ include a combination of measured and updated thresholds. As a non-limiting example, $t_1$, $t_2$ may be measured thresholds and $t_3$, $t_4$, $t_5$, and $t_6$ may be updated thresholds given a scenario in which an insufficient number of previously determined thresholds are available for determining updated thresholds for the first and second previous reflected chirps.

To calculate an updated threshold for the current reflected chirp, the signal processor 110 may be configured to determine a predicted threshold for the current reflected chirp by determining a respective maximum of the previously determined thresholds for each section of previous reflected chirps and then determining a minimum of the determined maximums (e.g., corresponding block 302 of the method 300 of FIG. 3, or corresponding to blocks 402 and 404 of the method 400 of FIG. 4), determine a measured threshold for the current reflected chirp using, for example, a conventional or non-recursive thresholding process (e.g., corresponding to block 304 of the method 300 of FIG. 3), and determine the average of the predicted threshold and the measured threshold (e.g., corresponding to block 306 of the method 300 of FIG. 3). In the present example, the signal processor 110 determines the maximum of the previously determined thresholds $t_1$ and $t_2$ of the first section 502 using a maximum operation block 514, determines a maximum of the previously determined thresholds $t_3$ and $t_4$ of the second section 504 using a maximum operation block 516, determines a maximum of the previously determined thresholds $t_5$ and $t_6$ of the third section 506 using a maximum operation block 518, and determines a minimum of these determined maximums using a minimum operation block 520 to determine a predicted threshold $\tilde{t}_7$. The signal processor 110 determines a measured threshold $t_7$ for the current reflected chirp 508 using the associated threshold estimation block 512. The signal processor determines the updated threshold for the current reflected chirp 508 as an average of the measured threshold $t_7$ and the predicted threshold $\tilde{t}_7$ using the averaging operation block 522.

In accordance with various embodiments, the threshold estimation blocks 512, the maximum operation blocks 514, 516, and 518, the minimum operation block 520, and the averaging operation block 522 may be implemented using hardware, software, or any suitable combination thereof.

In one or more embodiments, each of the thresholds $t_1$, $t_2$, $t_3$, $t_4$, $t_5$, and $t_6$ may be determined by the signal processor 110 using the corresponding threshold estimation blocks 512 at the time the associated chirps are processed as the "current reflected chirp", and the thresholds $t_1$, $t_2$, $t_3$, $t_4$, $t_5$, and $t_6$ may be stored in one or more buffers or other temporary computer-readable memory devices for subsequent processing (e.g., for determination of predicted and updated thresholds for subsequent reflected chirps), where such buffers or memory devices may be included in or coupled to the MCPU 104. In one or more embodiments, additional buffers or memory devices may be included in or coupled to the MCPU 104 and may be configured to store maximum values output by the maximum operation blocks 514, one or more minimum values output by the minimum operation block 520, the updated threshold output by the averaging operation block 522, or any suitable combination of these.

Memory utilization for one or more embodiments of recursive thresholding processes herein may be reduce by periodically calculating the predicted threshold and using that predicted threshold to determine the updated thresholds for multiple reflected chirps, rather than calculating a respective predicted threshold for each reflected chirp. For example, to determine the predicted threshold for each reflected chirp received by a given receiver module of the radar system, a buffer of size $N_S \times N_C$ may be required. If instead the predicted threshold is performed once every $N_C$ reflected chirps, then a buffer of size $N_S + N_C$ may be required (e.g., one buffer of size $N_S$ to store the maximum threshold values, one for each section, and another buffer of size $N_C$ to store individual previously determined thresholds for partial sections (i.e., sections for which not all reflected chirps have yet been received and processed). An example of a recursive thresholding process that utilizes such periodic predicted threshold determination is shown in FIG. 6.

Figure 6:
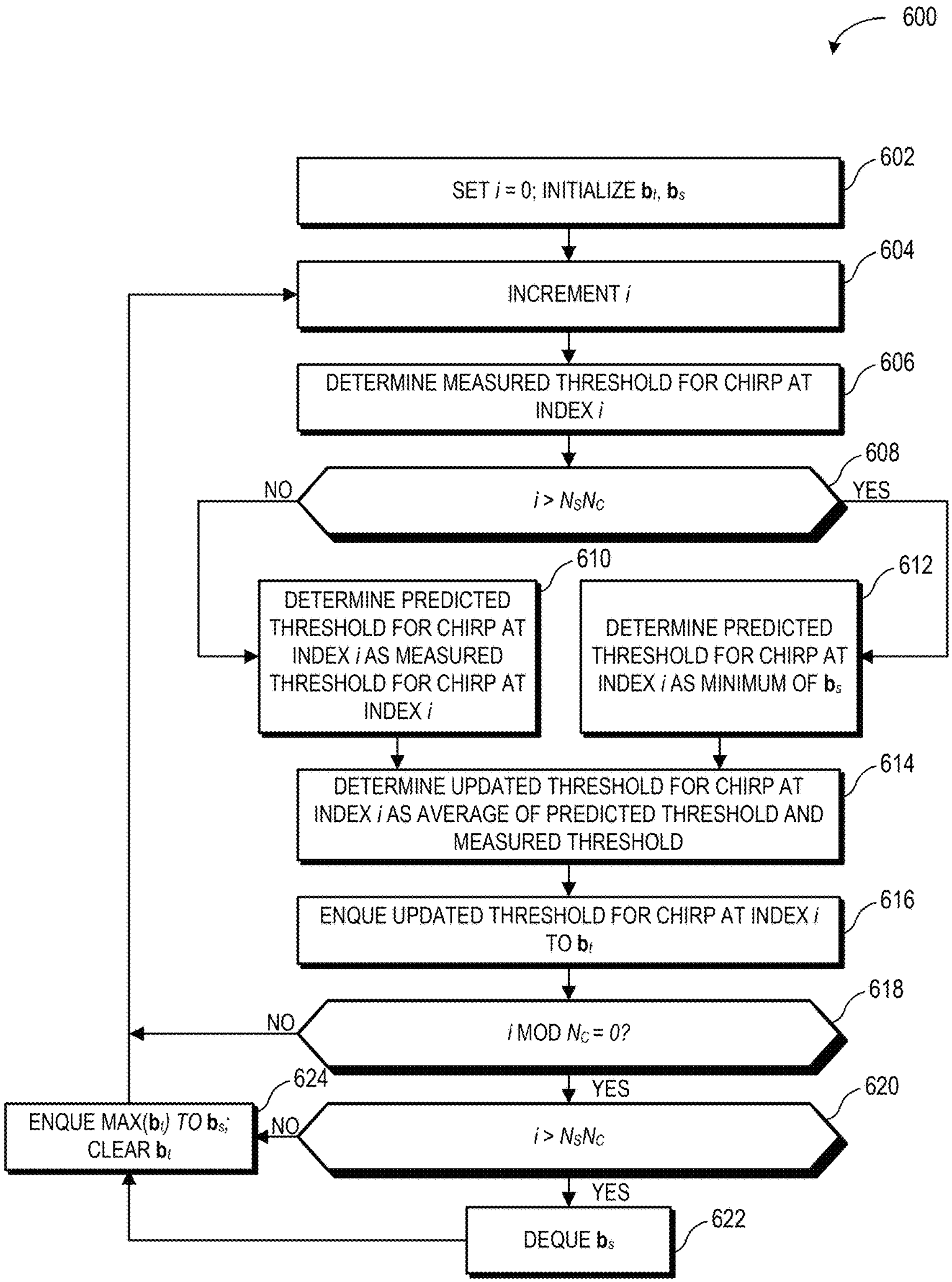
FIG. 6 shows an illustrative process flow for a method of interference suppression that includes recursive thresholding that utilizes a min-max operation with periodic predicted threshold determination, in accordance with various embodiments.

FIG. 6 shows an illustrative process flow for a method 600 by which a signal processor of a radar system (e.g., the signal processor 110 of the radar system 100 of FIG. 1) may perform recursive thresholding (e.g., determining or estimating a threshold recursively). In one or more embodiments, the method 600 may be performed as part of an interference suppression process. in one or more embodiments, interference suppression performed at block 204 of the method 200 of FIG. 2 include the method 600. The method 600 is described here with reference to elements of the radar system 100 of FIG. 1. However, it should be understood that this is illustrative and not limiting, at least in that other suitable radar systems may be used to carry out the method 600 in one or more other embodiments. The method 600 may correspond to a generalized version of one or more embodiments of the recursive thresholding process illustrated in the diagram 500 of FIG. 5, with the added constraint of the predicted threshold 1 for the current reflected chirp at index i being calculated once every $N_C$ reflected chirps.

The signal processor 110 may perform the method 600 while the ADC 130 provides ADC samples to the MCPU 104. For a given frame of radar data containing N chirps, the signal processor 110 may receive ADC samples $S=(s_i)_{1 \le i \le N}$ where $s_i$ represents the ADC samples of the $i^{th}$ chirp. It should be understood that, in the present example, chirps represented in the ADC samples correspond to reflected chirps. The MCPU 104 may include or may be coupled to one or more buffers or other suitable memory devices configured to implement a first queue $b_t$ and a second queue $b_s$. The queue $b_t$ may have a size equal to the number of chirps per section, $N_C$. The queue $b_s$ may have a size equal to the number of sections, $N_S$. The method 600 may calculate or otherwise determine a set of thresholds $\hat{t}=(\hat{t}_i)_{1 \le i \le N}$, with each threshold of the set corresponding to a respective chirp of the ADC samples S. The signal processor 110 may be configured to apply each threshold $\hat{t}_i$ to corresponding ADC samples $s_i$ as part of an interference suppression process (e.g., at block 204 of FIG. 2, as a non-limiting example). For example, applications of a threshold $\hat{t}_i$ may include zeroing or suppressing (e.g., reducing the magnitude of) ADC samples of $s_i$ having magnitudes greater than the threshold $\hat{t}_i$.

At block 602, the signal processor 110 sets the index i=0 and initializes the queues $b_t$ and $b_s$.

At block 604, the signal processor 110 increments the index i. When the index i is incremented in this way, a new chirp becomes the current chirp.

At block 606, the signal processor 110 determines a measured threshold t for the chirp at index i. In one or more embodiments, a conventional or non-recursive thresholding process, such as a time domain thresholding process or a time-frequency domain thresholding process, may be performed by the signal processor 110 to determine the measured threshold t.

At block 608, the signal processor 110 compares the index i to the product of $N_S \times N_C$. If $i \leq N_S \times N_C$, then the method 600 proceeds to block 610. Otherwise, if $i > N_S \times N_C$, then the method 600 proceeds to block 612.

At block 610, in response to determining that $i \leq N_S \times N_C$, the signal processor 110 determines a predicted threshold t for the current chirp to be equal to the measured threshold t determined for the current chirp at block 606. For example, i is less than or equal to $N_S \times N_C$, indicating that an insufficient number of previously determined thresholds are available to recursively determine the updated threshold $\hat{t}_i$ for the $i^{th}$ chirp, and the predicted threshold t is instead set equal to the measured threshold t. When block 610 is performed for the current chirp, the updated threshold $\hat{t}_i$ for the current chirp is set equal to the measured threshold t for the current chirp when determined at block 614 (e.g., because $(\tilde{t}+t)/2=t$ given $\tilde{t}=t$).

At block 612, the signal processor 110 in response to determining that $i > N_S \times N_C$, the signal processor 110 determines a predicted threshold t for the current chirp to be equal to the minimum value stored in the queue $b_s$, which stores the per-section maximum values of the previously determined updated thresholds for the $N_S \times N_C$ chirps preceding the current chirp. When block 612 is performed for the current chirp, the updated threshold $\hat{t}_i$ for the current chirp is determined as the average of the measured threshold t and the minimum of the per-section maximum threshold values (e.g., the average of t and $\tilde{t}$) when determined at block 614.

At block 614, the signal processor 110 determines the updated threshold $\hat{t}_i$ for the current chirp as the average of the measured threshold t and the predicted threshold $\tilde{t}$. The updated threshold $\hat{t}_i$ may then be used by the signal processor 110 to perform interference suppression for the current chirp (e.g., generating interference-suppressed ADC samples for the current chirp).

At block 616, the signal processor 110 enqueues (i.e., adds to the queue) the updated threshold $\hat{t}_i$ to the queue $b_t$.

At block 618, the signal processor 110 determines whether i modulo $N_C=0$. If i modulo $N_C=0$, then the method 600 proceeds to block 620. Otherwise, if i modulo $N_C \neq 0$, then the method 600 returns to block 604 at which the signal processor increments the value of the index i. This determination at block 618 ensures that the queue $b_s$ and, therefore, the predicted threshold determined at block 612 are only updated for every $N_C$ chirps. For example, if i modulo $N_C \neq 0$, the queue $b_s$ is not updated at block 624 before the next chirp is processed, such that the predicted threshold determined at the next iteration of block 612 does not change from the predicted threshold determined at the most recent iteration of block 612. That is, the signal processor 110 is configured to set the predicted threshold for a current chirp for which i modulo $N_C$ is non-zero to be equal to the most recently determined predicted threshold for a previous set of samples (corresponding to a previously processed chirp) for which i modulo $N_C$ equals zero.

At block 620, the signal processor 110 compares the index i to the product of $N_S \times N_C$. If $i \leq N_S \times N_C$, then the method 600 proceeds to block 624. Otherwise, if $i > N_S \times N_C$, then the method 600 proceeds to block 622.

At block 622, the signal processor 110 dequeues (i.e., removes from the queue) the oldest threshold value stored at the queue $b_s$. For example, when i modulo $N_C=0$, a new maximum value will be added to the queue $b_s$. If $i > N_S \times N_C$, then the queue $b_s$ is expected to be full, and the signal processor 110 is configured to dequeue the oldest threshold value to make room for the new expected threshold value. The method 600 then proceeds to block 624.

At block 624, the signal processor 110 enqueues the maximum threshold value stored at the queue $b_t$ to the queue $b_s$ and clears the queue $b_t$ (e.g., removing all threshold values stored at the queue $b_t$). For example, the queue $b_t$ may be full when i modulo $N_C=0$, indicating that all threshold values for the corresponding section are available such that the maximum value of those threshold values can be determined by the signal processor 110 and stored at the queue $b_s$. The method 600 may then return to block 604 at which the signal processor increments the value of the index i.

The method 600 may continue until the ADC samples for all N chirps for the current frame are processed. In one or more embodiments, the method 600 may be performed for each frame of received radar signal data processed by the signal processor 110.

Figure 7:
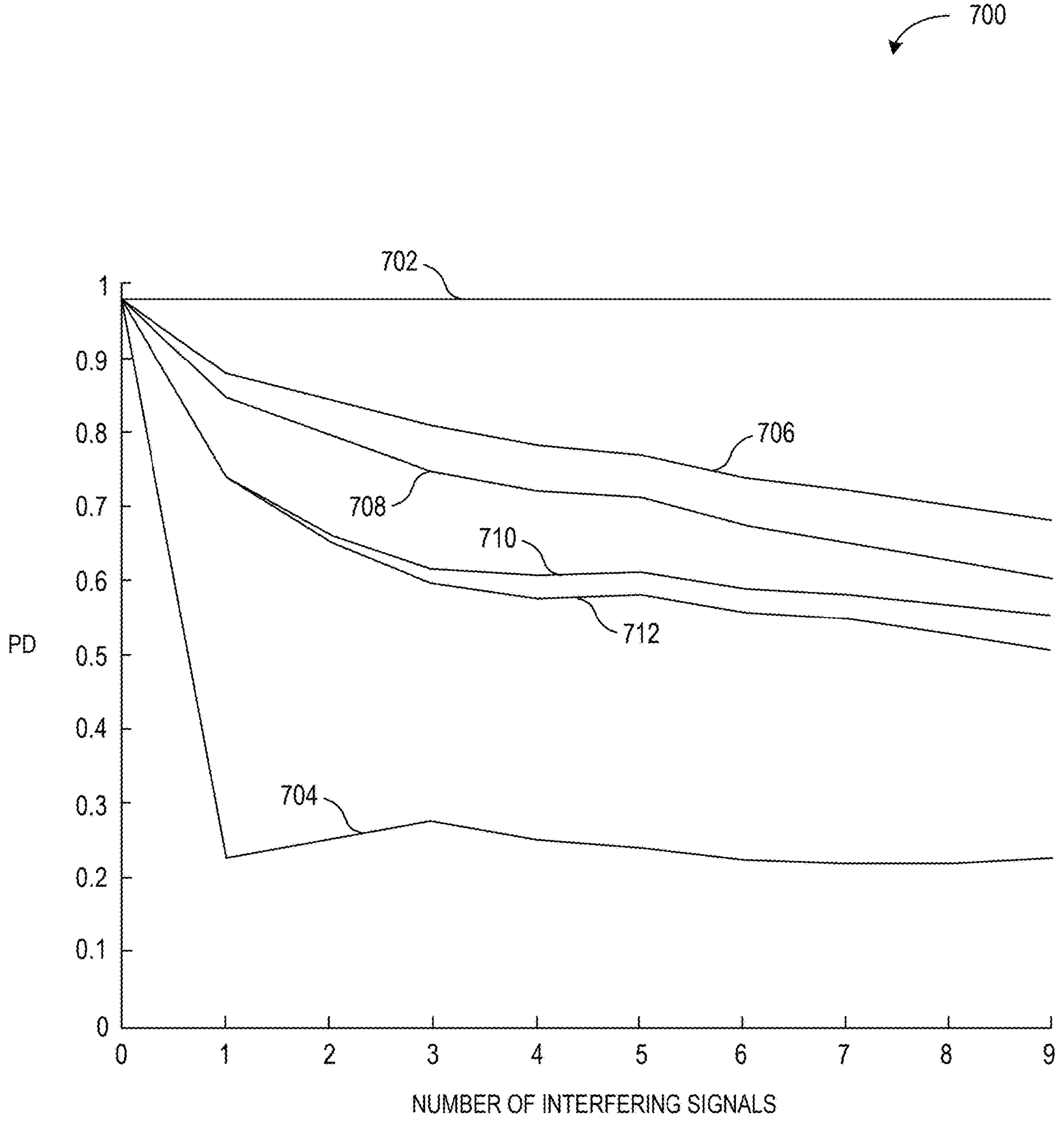
FIG. 7 shows a graph illustrating the probability of detection versus number of interfering signals for various interference suppression approaches, including recursive thresholding processes, in accordance with various embodiments.

FIG. 7 is an illustrative graph 700 showing the probability of detection (PD) of a valid peak versus number of interfering signals for radar systems implementing interference suppression processes with and without recursive thresholding. The present example considers a scenario in which the probability of false alarm is 0.0001, the signal-to-noise ratio is greater than 24, and background interference is excluded. For purposes of comparison, curve 702 represents the probability of detection with all interference components removed and curve 704 represents the probability of detection when no interference suppression is performed.

The curve 706 represents the performance of a radar system that utilizes a time-frequency domain based interference suppression process that utilizes a recursive threshold process (e.g., an embodiment of a recursive threshold process as described herein). The curve 708 represents the performance of a radar system that utilizes a time-frequency domain based interference suppression process that does not utilize a recursive thresholding process. As shown, the probability of detection of the radar system associated with the curve 706 exceeds that of the radar system associated with the curve 708, with the performance gap increasing as the number of interfering signals increases.

The curve 710 represents the performance of a radar system that utilizes a time domain based interference suppression process that utilizes a recursive threshold process (e.g., an embodiment of a recursive threshold process as described herein, such as that of the method 300 of FIG. 3). The curve 712 represents the performance of a radar system that utilizes a time domain based interference suppression process that does not utilize a recursive thresholding process. As shown, the probability of detection of the radar system associated with the curve 710 matches or exceeds that of the radar system associated with the curve 712, with the performance gap increasing as the number of interfering signals increases.

As shown, by utilizing recursive thresholding, as described herein, as part of an interference suppression process, the probability of detection of valid targets by a given radar system may be advantageously increased. This performance advantage may be greater in complex interference scenarios with higher numbers of interfering signals.

In an example embodiment, a radar system includes communication circuitry configured to transmit radar signals and to receive reflected radar signals corresponding to reflections of the transmitted radar signals by at least one object in an environment of the radar system, and signal processing circuitry configured to receive sets of samples from the communication circuitry, where each of the sets of samples represents a respective reflected radar signal of the reflected radar signals, and generate sets of interference-suppressed samples including a first set of interference-suppressed samples corresponding to a first reflected radar signal represented by a first set of samples of the sets of samples. To generate the first set of interference-suppressed samples, the signal processing circuitry may be configured to determine a first threshold based on at least one previously determined threshold for at least a second set of samples of the sets of samples, determine a second threshold based on the first set of samples, determine a third threshold as an average of the first threshold and the second threshold, and apply the third threshold to the first set of samples to remove or suppress interference components of the first set of samples to generate the first set of interference-suppressed samples.

In one or more embodiments, each of the reflected radar signals corresponds to a respective reflected chirp, where the first reflected radar signal includes a first reflected chirp, where a second reflected radar signal represented by the second set of samples of the set of samples includes a second reflected chirp.

In one or more embodiments, the at least one previously determined threshold includes $N_C \times N_S$ previously determined thresholds for $N_S$ groups each including $N_C$ sets of samples.

In one or more embodiments, to determine the first threshold, the signal processing circuitry is configured to perform a min-max operation on the $N_C \times N_S$ previously determined thresholds.

In one or more embodiments, to perform the min-max operation, the signal processing circuitry is configured to determine a set of maximums, each corresponding to a maximum threshold for a respective group of the $N_S$ groups, and determine a minimum of the set of maximums, where the first threshold is the determined minimum.

In one or more embodiments, in response to determining that fewer than $N_C \times N_S$ previously determined thresholds are available when generating a third set of interference-suppressed samples based on a third set of samples, and the signal processing circuitry is further configured to determine a threshold for the third set of samples by performing a thresholding process selected from the group consisting of: a time domain thresholding process and a time-frequency domain thresholding process, and apply the threshold to the third set of samples to generate the third set of interference-suppressed samples.

In one or more embodiments, to determine the second threshold, the signal processing circuitry is configured to execute a thresholding process selected from the group consisting of a time domain thresholding process and a time-frequency domain thresholding process.

In one or more embodiments, to apply the third threshold to the first set of samples, the signal processing circuitry is further configured to identify samples of the first set of samples having magnitudes that exceed the third threshold, and reduce the magnitudes of the identified samples to generate the first set of interference-suppressed samples.

In an example embodiment, method includes transmitting radar signals with at least one transmitter module of a radar system, receiving, with at least one receiver module of the radar system, reflected radar signals corresponding to reflections of the transmitted radar signals by at least one object in an environment of the radar system, receiving, by signal processing circuitry of the radar system, sets of samples from the at least one receiver module, where each of the sets of samples represents a respective reflected radar signal of the reflected radar signals, generating, by the signal processing circuitry, sets of interference-suppressed samples including a first set of interference-suppressed samples corresponding to a first reflected radar signal represented by a first set of samples of the sets of samples. Generating the first set of interference-suppressed samples includes determining a first threshold based on at least one previously determined threshold for at least a second set of samples of the sets of samples, determining a second threshold based on the first set of samples, determining a third threshold as an average of the first threshold and the second threshold, and applying the third threshold to the first set of samples to remove or suppress interference components of the first set of samples to generate the first set of interference-suppressed samples.

In one or more embodiments, each of the reflected radar signals corresponds to a respective reflected chirp, the first reflected radar signal includes a first reflected chirp, and a second reflected radar signal represented by the second set of samples of the set of samples includes a second reflected chirp.

In one or more embodiments, the at least one previously determined threshold includes $N_C \times N_S$ previously determined thresholds for $N_S$ groups each including $N_C$ sets of samples.

In one or more embodiments, determining the first threshold includes performing a min-max operation on the $N_C \times N_S$ previously determined thresholds.

In one or more embodiments, performing the min-max operation includes determining a set of maximums, each corresponding to a maximum threshold for a respective group of the $N_S$ groups, and determining a minimum of the set of maximums, where the first threshold is the determined minimum.

In one or more embodiments, the method further includes determining, by the signal processing circuitry, that fewer than $N_C \times N_S$ previously determined thresholds are available when generating a third set of interference-suppressed samples based on a third set of samples, determining, by the signal processing circuitry, a threshold for the third set of samples by performing a thresholding process selected from the group consisting of: a time domain thresholding process and a time-frequency domain thresholding process, and applying, by the signal processing circuitry, the threshold to the third set of samples to generate the third set of interference-suppressed samples.

In one or more embodiments, determining the second threshold includes executing a thresholding process selected from the group consisting of a time domain thresholding process and a time-frequency domain thresholding process.

In one or more embodiments, applying the third threshold to the first set of samples includes identifying samples of the first set of samples having magnitudes that exceed the third threshold, and reducing the magnitudes of the identified samples to generate the first set of interference-suppressed samples.

In an example embodiment, a method includes transmitting radar signals with at least one transmitter module of a radar system, receiving, with at least one receiver module of the radar system, reflected radar signals corresponding to reflections of the transmitted radar signals by at least one object in an environment of the radar system, receiving, by signal processing circuitry of the radar system, sets of samples from the at least one receiver module, where each of the sets of samples has a respective index i and represents a respective reflected radar signal of the reflected radar signals, and the sets of samples are organized into groups with $N_C$ samples in each of the groups, and generating, by the signal processing circuitry, sets of interference-suppressed samples by determining a predicted threshold based at least one previously determined threshold, determining a measured threshold based on a current set of samples of the sets of samples, determining an updated threshold as an average of the predicted threshold and the measured threshold, and applying the updated threshold to the current set of samples to remove or suppress interference components of the current set of samples.

In one or more embodiments, generating the sets of interference-suppressed samples further includes in response to determining that, for the current set of samples, i modulo $N_C$ equals zero, determining the predicted threshold based on $N_C \times N_S$ previously determined thresholds stored in a first queue, where $N_S$ is a predetermined number of groups.

In one or more embodiments, generating the sets of interference-suppressed samples further includes, in response to determining that, for the current set of samples, i modulo $N_C$ is non-zero, determining the predicted threshold as equal to a previously determined predicted threshold for a previous set of samples for which i modulo $N_C$ equals zero.

In one or more embodiments, the at least one previously determined threshold includes $N_C \times N_S$ previously determined thresholds for $N_S$ groups each including $N_C$ sets of samples, and determining the predicted threshold includes performing a min-max operation on the $N_C \times N_S$ previously determined thresholds by determining a set of maximums, each corresponding to a maximum threshold for a respective group of the $N_S$ groups, and determining a minimum of the set of maximums, where the predicted threshold is the determined minimum.

Although the operations of the method(s) herein are shown and described in a particular order, the order of the operations of each method may be altered so that certain operations may be performed in an inverse order or so that certain operations may be performed, at least in part, concurrently with other operations. In one or more other embodiments, instructions or sub-operations of distinct operations may be implemented in an intermittent and/or alternating manner.

It should also be noted that at least some of the operations for the method(s) described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk.

Alternatively, embodiments herein may be implemented entirely in hardware or in an implementation containing both hardware and software elements. In embodiments which use software, the software may include but is not limited to firmware, resident software, microcode, or other suitable software.

As used herein the terms "circuit" and "circuitry," including the term "processing circuitry" and related terminology means any suitable combination(s) of analog or digital circuit elements, hardware, firmware, software, and the like; including but not limited to, application-specific integrated circuits (ASICs), field programmable gate arrays (FPGAs), microcontrollers, and microprocessors. It will be understood that the term "circuitry" encompasses nonvolatile and volatile memory devices including, but not limited to random access memory (RAM), read-only memory (ROM), and the like, which can be implemented using any suitable devices, such as SRAM, DRAM, or magnetic storage devices as non-limiting examples. Along these lines it will be understood that references to a "processor" or "processing circuitry" can include devices in which general purpose computing devices includes or is otherwise coupled to memory which stores machine-readable instructions configured to cause the processing circuitry to perform the described actions. Such instructions can be stored as instructions in a high level programming language that is readable by human beings which are that are interpreted or compiled into object code or machine language, or they may be stored directly in a low-level language such as object code or machine language or another suitable representation, as nonlimiting examples.

It will be further understood that, unless explicitly stated otherwise, that features such as processing circuitry, memory, and related circuitry and devices can be implemented by any suitable combinations of one or more localized devices including, but not limiting to distributed systems formed by multiple distinct devices in communication with each other via direct electrical communication connections, wireless communication connections, and via public or private communication networks including the Internet. It will further be understood processing circuitry and related devices may be implemented by one or more physical machines or by virtual machines including, but not limited to, virtualized computing environments provided within a "cloud" computing environment or other virtualization systems.

While at least one exemplary embodiment has been presented in the foregoing detailed description, it should be appreciated that a vast number of variations exist. It should also be appreciated that exemplary embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A radar system comprising:

communication circuitry configured to transmit radar signals and to receive reflected radar signals corresponding to reflections of the transmitted radar signals by at least one object in an environment of the radar system; and signal processing circuitry configured to:

receive sets of samples from the communication circuitry, wherein each of the sets of samples represents a respective reflected radar signal of the reflected radar signals; and generate sets of interference-suppressed samples including a first set of interference-suppressed samples corresponding to a first reflected radar signal represented by a first set of samples of the sets of samples, wherein, to generate the first set of interference-suppressed samples, the signal processing circuitry is configured to:

determine a first threshold based on at least one previously determined threshold for at least a second set of samples of the sets of samples;

determine a second threshold based on the first set of samples;

determine a third threshold as an average of the first threshold and the second threshold; and apply the third threshold to the first set of samples to remove or suppress interference components of the first set of samples to generate the first set of interference-suppressed samples.

2. The radar system of claim 1, wherein each of the reflected radar signals corresponds to a respective reflected chirp, wherein the first reflected radar signal includes a first reflected chirp, wherein a second reflected radar signal represented by the second set of samples of the set of samples includes a second reflected chirp.

3. The radar system of claim 1, wherein the at least one previously determined threshold comprises $N_C \times N_S$ previously determined thresholds for $N_S$ groups each including $N_C$ sets of samples.

4. The radar system of claim 3, wherein, to determine the first threshold, the signal processing circuitry is configured to perform a min-max operation on the $N_C \times N_S$ previously determined thresholds.

5. The radar system of claim 4, wherein, to perform the min-max operation, the signal processing circuitry is configured to:

determine a set of maximums, each corresponding to a maximum threshold for a respective group of the $N_S$ groups; and determine a minimum of the set of maximums, wherein the first threshold is the determined minimum.

6. The radar system of claim 3, wherein in response to determining that fewer than $N_C \times N_S$ previously determined thresholds are available when generating a third set of interference-suppressed samples based on a third set of samples, the signal processing circuitry is further configured to:

determine a threshold for the third set of samples by performing a thresholding process selected from the group consisting of: a time domain thresholding process and a time-frequency domain thresholding process; and apply the threshold to the third set of samples to generate the third set of interference-suppressed samples.

7. The radar system of claim 1, wherein, to determine the second threshold, the signal processing circuitry is configured to execute a thresholding process selected from the group consisting of: a time domain thresholding process and a time-frequency domain thresholding process.

8. The radar system of claim 7, wherein, to apply the third threshold to the first set of samples, the signal processing circuitry is further configured to:

identify samples of the first set of samples having magnitudes that exceed the third threshold; and reduce the magnitudes of the identified samples to generate the first set of interference-suppressed samples.

9. A method comprising:

transmitting radar signals with at least one transmitter module of a radar system;

receiving, with at least one receiver module of the radar system, reflected radar signals corresponding to reflections of the transmitted radar signals by at least one object in an environment of the radar system;

receiving, by signal processing circuitry of the radar system, sets of samples from the at least one receiver module, wherein each of the sets of samples represents a respective reflected radar signal of the reflected radar signals;

generating, by the signal processing circuitry, sets of interference-suppressed samples including a first set of interference-suppressed samples corresponding to a first reflected radar signal represented by a first set of samples of the sets of samples, wherein, generating the first set of interference-suppressed samples includes:

determining a first threshold based on at least one previously determined threshold for at least a second set of samples of the sets of samples;

determining a second threshold based on the first set of samples;

determining a third threshold as an average of the first threshold and the second threshold; and applying the third threshold to the first set of samples to remove or suppress interference components of the first set of samples to generate the first set of interference-suppressed samples.

10. The method of claim 9, wherein each of the reflected radar signals corresponds to a respective reflected chirp, wherein the first reflected radar signal includes a first reflected chirp, wherein a second reflected radar signal represented by the second set of samples of the set of samples includes a second reflected chirp.

11. The method of claim 9, wherein the at least one previously determined threshold comprises $N_C \times N_S$ previously determined thresholds for $N_S$ groups each including $N_C$ sets of samples.

12. The method of claim 11, wherein determining the first threshold includes performing a min-max operation on the $N_C \times N_S$ previously determined thresholds.

13. The method of claim 12, wherein performing the min-max operation comprises:

determining a set of maximums, each corresponding to a maximum threshold for a respective group of the $N_S$ groups; and determining a minimum of the set of maximums, wherein the first threshold is the determined minimum.

14. The method of claim 11, further comprising:

determining, by the signal processing circuitry, that fewer than $N_C \times N_S$ previously determined thresholds are available when generating a third set of interference-suppressed samples based on a third set of samples;

determining, by the signal processing circuitry, a threshold for the third set of samples by performing a thresholding process selected from the group consisting of: a time domain thresholding process and a time-frequency domain thresholding process; and applying, by the signal processing circuitry, the threshold to the third set of samples to generate the third set of interference-suppressed samples.

15. The method of claim 9, wherein determining the second threshold comprises:

executing a thresholding process selected from the group consisting of: a time domain thresholding process and a time-frequency domain thresholding process.

16. The method of claim 15, wherein applying the third threshold to the first set of samples comprises:

identifying samples of the first set of samples having magnitudes that exceed the third threshold; and reducing the magnitudes of the identified samples to generate the first set of interference-suppressed samples.

17. A method comprising:

transmitting radar signals with at least one transmitter module of a radar system;

receiving, with at least one receiver module of the radar system, reflected radar signals corresponding to reflections of the transmitted radar signals by at least one object in an environment of the radar system;

receiving, by signal processing circuitry of the radar system, sets of samples from the at least one receiver module, wherein each of the sets of samples has a respective index i and represents a respective reflected radar signal of the reflected radar signals, and wherein the sets of samples are organized into groups with $N_C$ samples in each of the groups; and generating, by the signal processing circuitry, sets of interference-suppressed samples by:

determining a predicted threshold based at least one previously determined threshold;

determining a measured threshold based on a current set of samples of the sets of samples;

determining an updated threshold as an average of the predicted threshold and the measured threshold; and applying the updated threshold to the current set of samples to remove or suppress interference components of the current set of samples.

18. The method of claim 17, wherein generating the sets of interference-suppressed samples further comprises:

in response to determining that, for the current set of samples, i modulo $N_C$ equals zero, determining the predicted threshold based on $N_C \times N_S$ previously determined thresholds stored in a first queue, wherein $N_S$ is a predetermined number of groups.

19. The method of claim 18, wherein the at least one previously determined threshold comprises $N_C \times N_S$ previously determined thresholds for $N_S$ groups each including $N_C$ sets of samples, and wherein determining the predicted threshold includes performing a min-max operation on the $N_C \times N_S$ previously determined thresholds by:

determining a set of maximums, each corresponding to a maximum threshold for a respective group of the $N_S$ groups; and determining a minimum of the set of maximums, wherein the predicted threshold is the determined minimum.

20. The method of claim 17, wherein generating the sets of interference-suppressed samples further comprises:

in response to determining that, for the current set of samples, i modulo $N_C$ is non-zero, determining the predicted threshold as equal to a previously determined predicted threshold for a previous set of samples for which i modulo $N_C$ equals zero.

* * * * *